(12) United States Patent
Akinlemibola et al.

(10) Patent No.: US 12,253,354 B2
(45) Date of Patent: Mar. 18, 2025

(54) RADIO FREQUENCY IDENTIFICATION BASED THREE-DIMENSIONAL METROLOGY

(71) Applicant: INTERNATIONAL BUSINESS MACHINES CORPORATION, Armonk, NY (US)

(72) Inventors: Olawunmi Akinlemibola, Lanham, MD (US); Jennifer I. Bennett, Rochester, MN (US); Theron Lee Lewis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 17/457,349

(22) Filed: Dec. 2, 2021

(65) Prior Publication Data

US 2023/0175842 A1 Jun. 8, 2023

(51) Int. Cl.
*G01B 15/04* (2006.01)
(52) U.S. Cl.
CPC .................................... *G01B 15/04* (2013.01)
(58) Field of Classification Search
CPC ........... G01B 15/04; G01B 7/004; G01B 7/28
See application file for complete search history.

(56) References Cited

U.S. PATENT DOCUMENTS

| | | | |
|---|---|---|---|
| 5,218,294 A | 6/1993 | Soiferman | |
| 6,608,446 B1 | 8/2003 | Coumou | |
| 6,862,922 B2 | 3/2005 | Fitzgerald | |
| 8,581,606 B2 | 11/2013 | Kim | |
| 9,151,720 B2 | 10/2015 | Leflour | |
| 9,250,073 B2 | 2/2016 | Amor | |
| 10,078,767 B2 | 9/2018 | Tsirline | |
| 2009/0082964 A1 | 3/2009 | Robinson | |
| 2010/0097184 A1 | 4/2010 | Bauchot | |

(Continued)

FOREIGN PATENT DOCUMENTS

| | | |
|---|---|---|
| CN | 105354521 A | * 2/2016 |
| CN | 106132545 A | 11/2016 |

(Continued)

OTHER PUBLICATIONS

Yuan Zhang, "3-Dimensional Localization via RFID Tag Array", 2017, 2017 IEEE 14th International Conference on Mobile Ad Hoc and Sensor Systems) (Year: 2017).*

(Continued)

*Primary Examiner* — Catherine T. Rastovski
*Assistant Examiner* — Yossef Korang-Beheshti
(74) *Attorney, Agent, or Firm* — Tihon Poltavets (57) ABSTRACT

A method for obtaining three-dimension measurements for an object utilizing a population of radio-frequency identification (RFID) chips in a medium includes placing the object into a container with the population of RFID chips in the medium. The method also includes capturing a plurality of coordinates for the population of RFID chips in the medium, where a set of coordinates from the plurality of coordinates correspond to each RFID chip from the population of RFID chips. The method includes plotting the plurality of coordinates for the population of RFID chips in the medium, wherein a plot of the plurality of coordinates provides a three-dimensional image of the object.

20 Claims, 4 Drawing Sheets

(56) References Cited

U.S. PATENT DOCUMENTS

| | | |
|---|---|---|
| 2010/0256790 A1 | 10/2010 | Teran-Matus |
| 2016/0073081 A1 | 3/2016 | Becker |
| 2019/0346268 A1 | 11/2019 | He |
| 2020/0329228 A1 | 10/2020 | Furukawa |

FOREIGN PATENT DOCUMENTS

| | | |
|---|---|---|
| CN | 108426527 A | 8/2018 |
| CN | 113474791 A | 10/2021 |
| JP | 2006270456 A | 10/2006 |
| KR | 101281597 B1 | 1/2013 |
| WO | 2014113517 A1 | 7/2014 |

OTHER PUBLICATIONS

Akinlemibola et al., "Radio Frequency Identification Based Three-Dimensional Metrology", International Application No. PCT/CN2022/131070, International Filing Date Nov. 10, 2022, 29 pages.

International Searching Authority, "Notification of International Search Report and Written Opinion or Declaration", International Application No. PCT/CN2022/131070, Mailed Jan. 16, 2023, 11 pages.

ABR, "What is RFID and How Does RFID Work?" ,https://www.abr.com/what-is-rfid-how-does-rfid-work/, accessed Jun. 30, 2021, pp. 1-8.

Heidenhain, "Which touch probe is right for you?",https://www.heidenhain.US/resources-and-news/which-touch-probe-is-right-for-you/, Mar. 17, 2020, pp. 1-9.

Innerspec, "Laser Profiling", https://www.innerspec.com/knowledge/laser-profilometry/, accessed Jun. 30, 2021, pp. 1-3.

Jomaa et al., "RFID Antenna Near-field Characterization Using a New 3D Magnetic-Field Probe", https://www.astesj.com/publications/ASTESJ_020363.pdf, Advances in Science, Technology and Engineering Systems Journal vol. 2, No. 3, (2017), pp. 492-497.

Maloney, "Silicone Molds For Stove-Top Metal Casting", https://hackaday.com/2017/08/09/silicone-molds-for-stove-top-metal-casting/, Aug. 9, 2017, pp. 1-13.

Sawko et al., "Choosing the Optical Measurement Device That's Right for You",https://www.qualitymag.com/articles/95709-choosing-the-optical-measurement-device-thats-right-for-you.

TFOT, "Hitachi Develops World's Smallest RFID Chip", https://thefutureofthings.com/3221-hitachi-develops-worlds-smallest-rfid-chip/, accessed Jun. 30, 2021, pp. 1-2.

Wikipedia, "Industrial computed tomography", https://en.wikipedia.org/wiki/Industrial_computed_tomography, accessed Jun. 30, 2021, pp. 1-4.

\* cited by examiner

RADIO FREQUENCY IDENTIFICATION BASED THREE-DIMENSIONAL METROLOGY

BACKGROUND

This disclosure relates generally to three-dimensional metrology, and in particular, to utilizing radio frequency identification chips for generating three-dimensional metrology data.

A common approach for obtaining three-dimensional measurements for a physical object includes utilizing a coordinate measuring machine (CMM). A common CMM is a device capable of measuring the geometry of the physical object by sensing multiple points on a surface of the physical object with a touch probe. However, the further development of CMMs has introduced other techniques that include vision/optic, laser, and CT x-ray measurements for the geometry of the physical object. A probe system, a vision/optic system, and a laser system based techniques are limited to a focal distance for measurements, where components on the physical object can include dimensions with depths or features that are greater than the focal distances of a given technique. A CT x-ray system based technique can provide dimensions for the various depths of features of the components but requires a large quantity of images and analysis to reconstruct a three-dimensional models to accurately measure dimensions for the physical object.

SUMMARY

One aspect of an embodiment of the present invention discloses a method comprising, placing an object into a container with a plurality of radio-frequency identification (RFID) chips in a medium. The method further comprises capturing a plurality of coordinates for the plurality of RFID chips in the medium, wherein a set of coordinates from the plurality of coordinates correspond to each RFID chip from the plurality of RFID chips. The method further comprises plotting the plurality of coordinates for the plurality of RFID chips in the medium, wherein a plot of the plurality of coordinates provides a three-dimensional image of the object.

Another aspect of an embodiment of the present invention discloses a method comprising, initializing a plurality of RFID chips in a medium. The method further comprises receiving an initial plurality of coordinates for the plurality of RFID chips in the medium, wherein a set of coordinates from the initial plurality of coordinates correspond to each RFID chip from the plurality of RFID chips. The method further comprises receiving an updated plurality of coordinates for the plurality of RFID chips in the medium subsequent to placing an object into the medium with the plurality of RFID chips, wherein a set of coordinates from the updated plurality of coordinates correspond to each RFID chip from the plurality of RFID chips. The method further comprises plotting the set of coordinates from the updated plurality of coordinates for each RFID chip from the plurality of RFID chips to create a three-dimensional image of the object.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Embodiments of the present invention provide a method for obtaining three-dimension measurements for an object utilizing radio-frequency identification (RFID) chips in a medium, where the medium is of a casting material or a liquid. An RFID chip, often referred to as an RFID tag, includes a microchip with integrated circuitry for storing and processing information, along with modulating and demodulating radio-frequency signals. The RFID chip also includes an antenna for receiving and transmitting signals and a substrate, thus allowing for the RFID chip to provide coordinates for an object onto which the RFID chip is attached to. Dimensions of RFID chips have been steadily decreasing with advances in semiconductor lithographic technology, where dimensions have reached 0.15×0.15 millimeters with a 7.5 micrometer thickness for square shaped RFID chips. Embodiments of the present invention utilize a population of RFID chips within a medium to surround a sample of interest, where the sample of interest is an object positioned with the medium. Utilizing RFID chips with the smallest dimension available allows for a greater population of RFID chips within the medium, thus resulting in a greater density of RFID chips with the medium and a greater number of points of measurements for the topographical features for the object positioned within the medium. Embodiments of the present invention can receive and differentiate each RFID transmission from a number of RFID transmissions associated with the population of RFID chips within the medium.

The medium in which the population of RFID chips and the object is position in can be a casting material or a liquid material. Examples of a casting medium include but is not limited to agarose, silicone, epoxy resin, unsaturated polyester resin, and acrylic glass. Examples of a liquid material include but is not limited to agarose, polyacrylamide, gelatin, and carrageenan. Embodiments of the present invention receive the three-dimensional measurements for the object positioned with the medium in the form of x, y, and z coordinates for each RFID chip from the population of RFID chips, where a location of each RFID chip from the population of RFID chips provides the measurable data. As the object is placed into the medium, the object occupies a first volume in the medium. A remaining volume of the medium is occupied by the population of RFID chips, where the populations of RFID chips conform to the topographical features of the object placed into the medium. Subsequent to receiving the three-dimensional measurements from each RFID chip from the population of RFID chips, the object is removed from the medium and the population of RFID chips are recycled and reused for subsequent measurements for another object placed in the medium.

Figure 1:
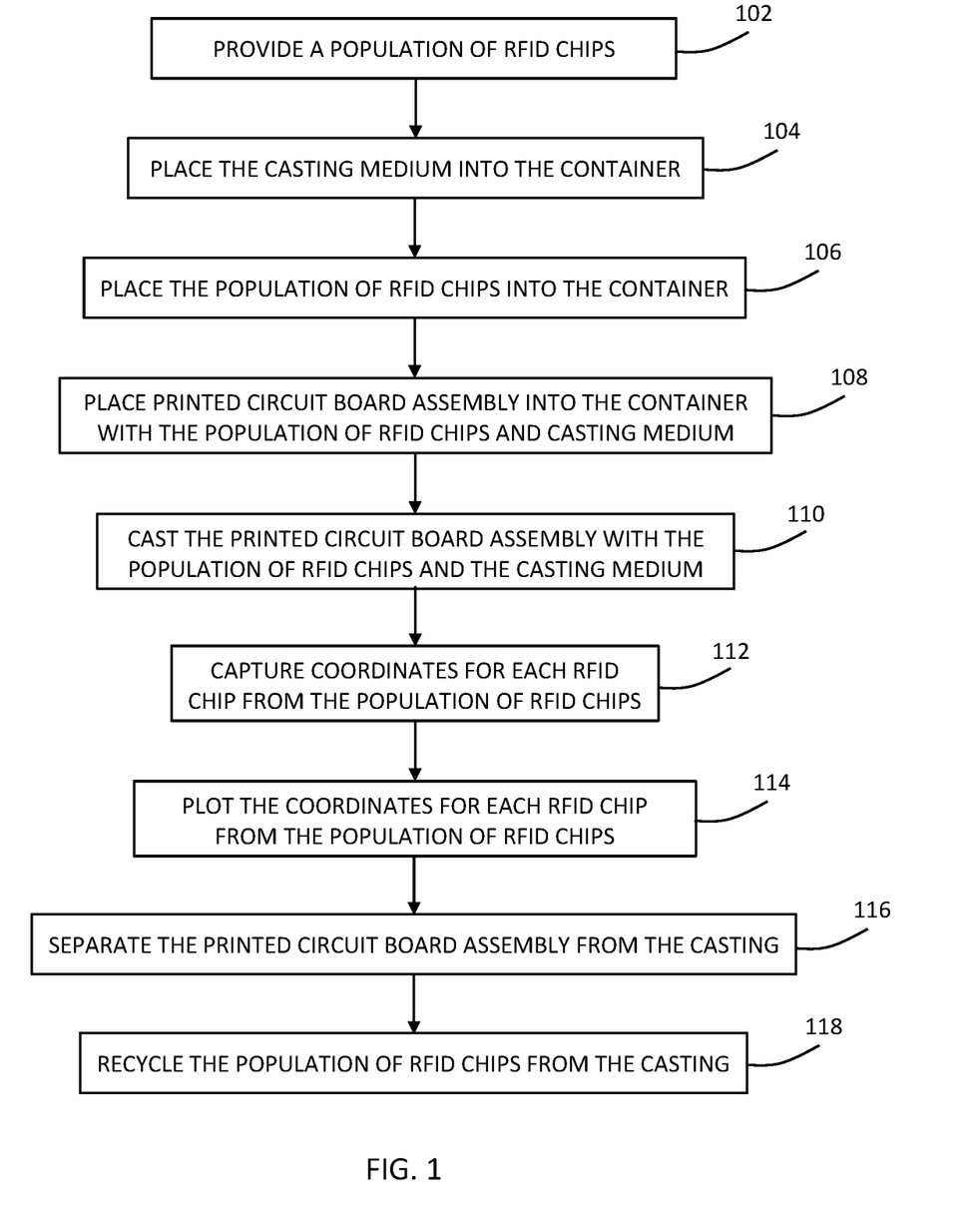
FIG. 1 depicts a method for obtaining three-dimension measurements for an object utilizing radio-frequency identification chips in a casting medium, in accordance with an embodiment of the present invention.

FIG. 1 depicts a method for obtaining three-dimension measurements for an object utilizing radio-frequency identification chips in a casting medium, in accordance with an embodiment of the present invention.

The method includes providing a population of RFID chips (102) for placement into a container with a casting medium. A quantity for the population of RFID chips is dependent on a size of each RFID chip from the population of RFID chips. Utilizing RFID chips with the smallest dimension available allows for a greater population of RFID chips within the casting medium, thus resulting in a greater density of RFID chips with the casting medium and a greater number of points of measurements for the topographical features for an object placed within the casting medium. In this embodiment, the object placed within the casting medium is a printed circuit board assembly. Providing the population of RFID chips also includes initializing the population of RFID chips to ensure each of the RFID chips is identifiable based on a unique identifier when associating with x, y, and z coordinates for each measurable data point.

The method includes placing the casting medium into the container (104). The container is selected based on a volume of an object (e.g., volume of a printed circuit board assembly) being submerged in the casting medium. Dimensions of the container are such that the object is completely submerged upon placement into the casting medium. Prior to solidification, the casting medium is typically in a liquid state until an external variable is introduced to the casting medium (e.g., heat). An example of a casting medium includes agarose material, which can mold around various components and features of the object. When applying heat to agarose material, the agarose material melts to a liquid consistency that can occupy various volumes surrounding the object being submerged into the casting medium. As the agarose material cools, the liquid consistency transitions to a gel consistency preventing any movement of the object and the population of RFID chips in the casting medium. The agarose material is removable by peeling the agarose material off the object and/or reapplying heat to transition the agarose material from the gel consistency back to the liquid consistency. Other examples of a casting material include but are not limited to: silicone, epoxy resin, unsaturated polyester resin, and acrylic glass.

The method includes placing the population of RFID chips into the container (106) with the casting medium. A combined volume of casting medium, volume of the population of RFID chips, and volume of the object is equal to or less than a volume of the container as defined by the dimensions of the container. In an alternative embodiment, the population of RFID chips are placed into the container prior to the placing of the casting medium into the container. To ensure an even distribution of the population of RFID chips in the casting medium, the population of RFID chips and the casting medium is mixed within the container. In an alternative embodiment, the population of RFID chips and casting medium are mixed prior to placement into the container in a mixing vessel. A vibrating mixer device can mix the population of RFID chips and the casting medium in the container to provide an even distribution of the RFID chips within the casting medium. The method can verify an even distribution by capturing initial coordinates for each RFID chip from the population of RFID chips and plotting the initial coordinates for each RFID chip from the population of RFID chips to determine a proper level of distribution for the population of RFID chips and casting medium mixture.

The method includes placing the printed circuit board assembly into the container with the population of RFID chips and casting medium (108). As previously mentioned, a volume of the casting medium is such that the object is fully submerged in the casting medium upon placement in the container. In this embodiment, three-dimensional measurement data is being obtained for a printed circuit board assembly, where the print circuit board assembly is placed into the container and fully submerged in the population of RFID chips and casting medium. While the casting medium is a liquid consistency, the casting medium surrounds various components on the printed circuit board assembly during the placement into the container with the population of RFID chips and casting medium. The method can include utilizing a vibrating mixer device to introduces vibrations to the container with the population of RFID chips, casting medium, and submerged printed circuit board assembly to eliminate any air pockets between the casting medium and the printed circuit board assembly. Eliminating the air pockets between the casting medium and the printed circuit board assembly ensures that the population of RFID chips and the casting medium conforms to all surfaces of the printed circuit board assembly, providing more accurate three-dimensional data points for the topographical features of the printed circuit board assembly.

The method includes casting the printed circuit board assembly with the population of RFID chips and the casting medium (110). Casting the printed circuit board assembly with the population of RFID chips and the casting medium includes transitioning the casting medium from a liquid consistency to a solidified consistency (e.g., gel). The solidified consistency prevents the movement of both, the population of RFID chips and the object (i.e., the printed circuit board assembly) submerged in the casting medium. In the example above, where agarose material is utilized as the casting medium, the method casts the printed circuit board assembly with the population of RFID chips by cooling the agarose material from a previously heated state. Cooling the agarose material can include bringing the container with the population of RFID chips, casting medium, and printed circuit board assembly to an ambient temperature and/or placing the casting medium the container with the population of RFID chips, casting medium, and printed circuit board assembly into a cooling vessel (e.g., refrigerator).

The method includes capturing coordinates for each RFID chip from the population of RFID chips (112). RFID readers positioned around the container transmit a signal to each RFID chip from the population of RFID chips and based on a known position of each of the RFID readers and dimensions of the container, the method captures a set of x, y, and z coordinates for each RFID chip from the population of RFID chips. Each RFID chip includes a unique tag identifier (TID) that is noneditable and allows for the method to associate each RFID chip with a captured set of x, y, and z coordinates. The method includes plotting the coordinates for each RFID chip from the population of RFID chips (114). Plotting each captured set of x, y, and z coordinates for each RFID tag from the population of RFID chips creates a three-dimensional image of the object, which in this embodiment is the printed circuit board assembly encased in the casting medium. Since each captured set of x, y, and z coordinates for each RFID tag from the population of RFID chips corresponds to a physical point in the casting medium, dimensions for all the various components and features of the printed circuit board assembly are obtainable through the captured coordinates. A volume of the casting medium in the container not occupied by the population of RFID chips, is occupied by the printed circuit board assembly submerged in the casting medium. As a result, the population of RFID tags surround and encompass the various components and features of the printed circuit board assembly.

The method includes separating the printed circuit board assembly from the casting (116). In one example, the casting medium in the solidified state encases the printed circuit board assembly but does not bond to the surface of the printed circuit board assembly. As a result, the casting medium can be peeled off the printed circuit board assembly without damaging components or features on the printed circuit board assembly. In another example, a solvent is utilized to remove the casting medium in the solidified state encasing the printed circuit board assembly, where the solvent is non-corrosive to the components or features on the printed circuit board assembly. In yet another example, the casting material in the solidified state encasing the printed circuit board assembly is transitioned to a liquified state. The method can include applying heat to the container with the printed circuit board assembly in the casting medium, where the heat transitions the casting medium (e.g., agarose material) with the population of RFID chips from the solidified state to a liquified state. The heat applied to the casting medium is such that the components or features on the printed circuit board assembly remain undamaged and intact, along with the population of RFID chips in the casting medium.

The method includes recycling the population of RFID chips from the casting (118). In the example where the casting medium was peeled off the printed circuit board assembly without damaging components or features on the printed circuit board assembly, the method can include applying a heating to the casting medium with the population of RFID chips. Applying the heat to the casting medium with the population of RFID chips transitions the casting medium from the solidified state to a liquified state. Upon the casting medium with the population of RFID chips reaching a liquified state, the method can include filtering the casting medium in the liquified state to separate the population of RFID chips from the casting medium. The population of RFID chips can be cleaned and reused in a subsequent casting. Depending on a type of casting medium (e.g., agarose material), the filtered casting medium can also be reused in a subsequent casting. In the example where a solvent is utilized to remove the casting medium from the printed circuit board assembly, the method can include filtering the casting medium with solvent to separate the population of RFID chips from the casting medium. The population of RFID chips can be cleaned and reused in a subsequent casting. In the example where heat is applied to transition the casting medium to a liquified state, the method can include filtering the casting medium in the liquified state to separate the population of RFID chips from the casting medium. The population of RFID chips can be cleaned and reused in a subsequent medium casting or liquid medium. Depending on a type of casting medium (e.g., agarose material), the filtered casting medium can also be reused in a subsequent three-dimensional measurement of an object.

Figure 2:
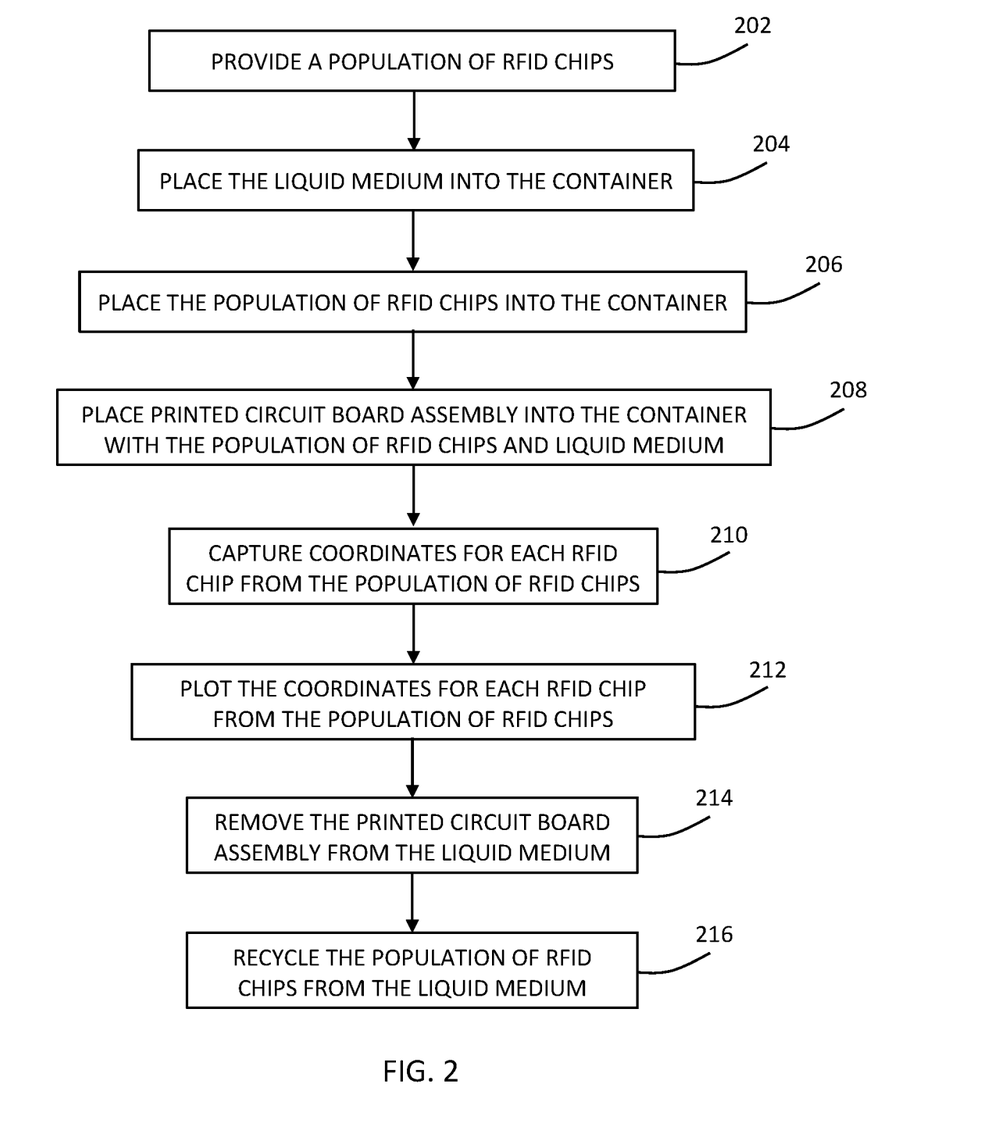
FIG. 2 depicts a method for obtaining three-dimension measurements for an object utilizing radio-frequency identification chips in a liquid medium, in accordance with an embodiment of the present invention.

FIG. 2 depicts a method for obtaining three-dimension measurements for an object utilizing radio-frequency identification chips in a liquid medium, in accordance with an embodiment of the present invention.

The method includes providing a population of RFID chips (202) for placement into a container with a liquid medium. A quantity for the population of RFID chips is dependent on a size of each RFID chip from the population of RFID chips. Utilizing RFID chips with the smallest dimension available allows for a greater population of RFID chips within the liquid medium, thus resulting in a greater density of RFID chips with the liquid medium and a greater number of points of measurements for the topographical features for an object placed within the liquid medium. In this embodiment, the object placed within the liquid medium is a printed circuit board assembly. Providing the population of RFID chips also includes initializing the population of RFID chips to ensure each of the RFID chips is identifiable based on a unique tag identifier (TID) when associating with x, y, and z coordinates for each measurable data point.

The method includes placing the liquid medium into the container (204). The container is selected based on a volume of an object (e.g., volume of a printed circuit board assembly) being submerged in the liquid medium. Dimensions of the container are such that the object is completely submerged upon placement into the liquid medium. Examples of a liquid medium include but are not limited to agarose, polyacrylamide, gelatin, and carrageenan.

The method includes placing the population of RFID chips into the container (206) with the liquid medium. A combined volume of liquid medium, volume of the population of RFID chips, and volume of the object is equal to or less than a volume of the container as defined by the dimensions of the container. In an alternative embodiment, the population of RFID chips are placed into the container prior to the placing of the liquid medium into the container. To ensure an even distribution of the population of RFID chips in the liquid medium, the population of RFID chips and the liquid medium is mixed within the container. In an alternative embodiment, the population of RFID chips and liquid medium are mixed prior to placement into the container in a mixing vessel. A vibrating mixer device can mix the population of RFID chips and the liquid medium in the container to provide an even distribution of the RFID chips within the liquid medium. The method can verify an even distribution by capturing initial coordinates for each RFID chip from the population of RFID chips and plotting the initial coordinates for each RFID chip from the population of RFID chips to determine a proper level of distribution for the population of RFID chips and liquid medium mixture.

The method includes placing the printed circuit board assembly into the container with the population of RFID chips and liquid medium (208). As previously mentioned, a volume of the liquid medium is such that the object is fully submerged in the liquid medium upon placement in the container, surrounding various components and features on the printed circuit board assembly. In this embodiment, three-dimensional measurement data is being obtained for a printed circuit board assembly, where the print circuit board assembly is placed into the container and fully submerged in the population of RFID chips and liquid medium. The method can include utilizing a vibrating mixer device to introduces vibrations to the container with the population of RFID chips, liquid medium, and submerged printed circuit board assembly to eliminate any air pockets between the liquid medium and the printed circuit board assembly. Eliminating the air pockets between the liquid medium and the printed circuit board assembly ensures that the population of RFID chips and the liquid medium conforms to all surfaces of the printed circuit board assembly, providing more accurate three-dimensional data points for the topographical features of the printed circuit board assembly.

The method includes capturing coordinates for each RFID chip from the population of RFID chips (210). RFID readers positioned around the container transmit a signal to each RFID chip from the population of RFID chips and based on a known position of each of the RFID readers and dimensions of the container, the method captures a set of x, y, and z coordinates for each RFID chip from the population of RFID chips. Each RFID chip includes a unique tag identifier (TID) that is noneditable and allows for the method to associate each RFID chip with a captured set of x, y, and z coordinates. The method includes plotting the coordinates for each RFID chip from the population of RFID chips (212). Plotting each captured set of x, y, and z coordinates for each RFID tag from the population of RFID chips creates a three-dimensional image of the object, which in this embodiment is the printed circuit board assembly encased in the liquid medium. Since each captured set of x, y, and z coordinates for each RFID tag from the population of RFID chips corresponds to a physical point in the liquid medium, dimensions for all the various components and features of the printed circuit board assembly are obtainable through the captured coordinates. A volume of the liquid medium in the container not occupied by the population of RFID chips, is occupied by the printed circuit board assembly submerged in the liquid medium. As a result, the population of RFID tags surround and encompass the various components and features of the printed circuit board assembly.

The method includes removing the printed circuit board assembly from the liquid medium (214). The method can also include rinsing the printed circuit board assembly to remove any remaining RFID chip attached to the surface of the printed circuit board assembly and drying the printed circuit board assembly (e.g., heat, compressed air). The method includes recycling the population of RFID chips from the liquid medium (216). The method can include filtering the liquid medium to separate the population of RFID chips from the liquid medium. The population of RFID chips can be cleaned and reused in a subsequent liquid medium or casting medium. Depending on a type of liquid medium (e.g., agarose material), the filtered liquid medium can also be reused in a subsequent three-dimensional measurement of an object.

Figure 3:
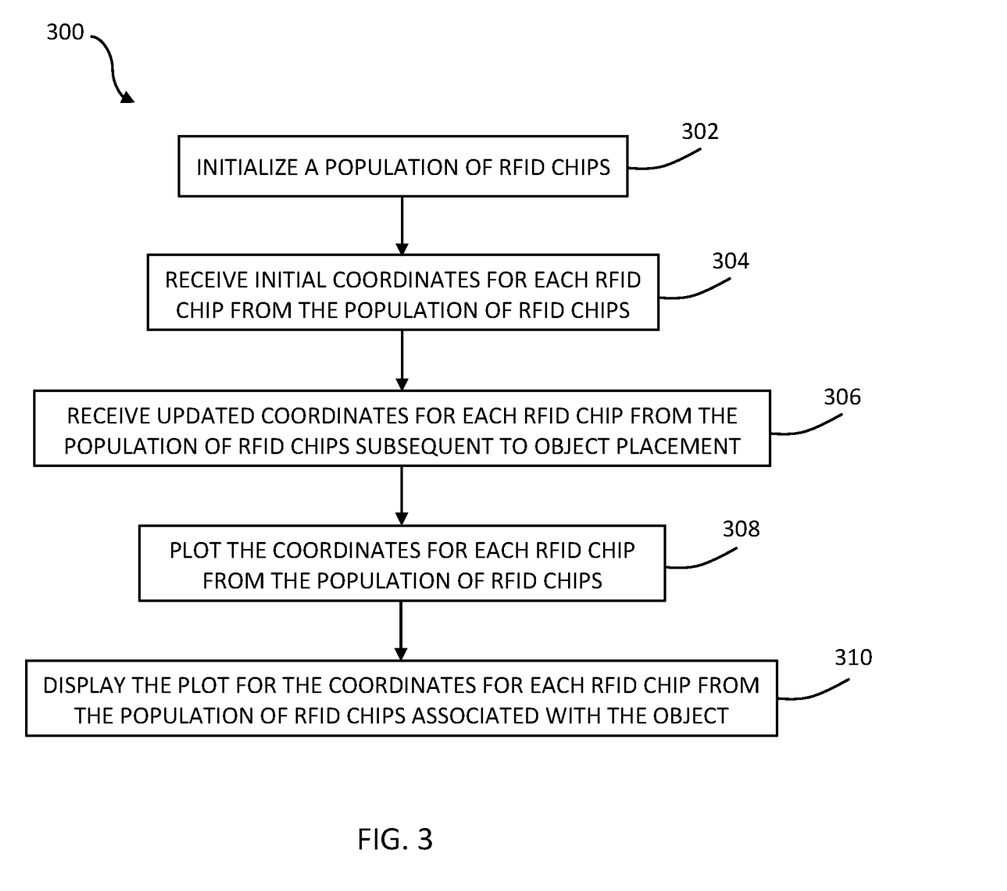
FIG. 3 depicts a method for initializing and obtaining three-dimensional measurements for an object utilizing radio-frequency identification chips in a medium, in accordance with an embodiment of the present invention.

FIG. 3 depicts a method for initializing and obtaining three-dimensional measurements for an object utilizing radio-frequency identification chips in a medium, in accordance with an embodiment of the present invention. Metrology process 300 is a program capable of initializing and obtaining three-dimensional measurements for an object utilizing radio-frequency identification chips in a casting or liquid medium.

Metrology process 300 initializes a population of RFID chips (302). Initialization of the population of RFID chips includes metrology process 300 transmitting a signal to a container with a casting medium or liquid medium to identify each RFID chip out of the population of RFID chips in the casting medium or liquid medium. Metrology process 300 identifies each RFID chip out of the population of RFID chips based on a unique tag identifier (TID) associated with each RFID chip.

Metrology process 300 receives initial coordinates for each RFID chip from the population of RFID chips (304). Multiple readers are positioned near the container with the casting medium or liquid medium to capture x, y, and z coordinates for each RFID chip to ensure an even distribution of the population of RFID chips in the casting medium. To facilitate the event distribution, the population of RFID chips and the casting medium are mixed within the container. The container with the population of RFID chips in casting medium or liquid medium is placeable on a vibrating mixer device, where metrology process 300 can instruct the vibrating mixer device to mix the casting medium or liquid medium until a desired level of distribution for the population of RFID chips is reached. Metrology process 300 verifies a desired distribution by capturing the initial coordinates for each RFID chip from the population of RFID chips and plotting the initial coordinates for each RFID chip from the population of RFID chips to determine a proper level of distribution for the population of RFID chips in the casting medium or liquid medium.

Metrology process 300 receives updated coordinates for each RFID chip from the population of RFID chips subsequent to object placement (306). Subsequent to placement of the object (i.e., printed circuit board assembly) into the container with the population of RFID chips in the casting medium or liquid medium, metrology process 300 receives new coordinates for each RFID chip from the population of RFID chips. The multiple readers are positioned near the container with the casting medium or liquid medium and printed circuit board assembly to capture x, y, and z coordinates for each RFID chip of the population of RFID chips in the casting medium. The multiple RFID readers transmit a signal to each RFID chip from the population of RFID chips and based on a known position of each of the RFID readers and dimensions of the container, metrology process receives a set of x, y, and z coordinates for each RFID chip from the population of RFID chips. Each RFID chip includes a unique tag identifier (TID) that is noneditable and allows for the method to associate each RFID chip with a captured set of x, y, and z coordinates.

Metrology process 300 plots the coordinates for each RFID chip from the population of RFID chips (308). Plotting each captured set of x, y, and z coordinates for each RFID tag from the population of RFID chips creates a three-dimensional image of the object, which in this embodiment is the printed circuit board assembly in the casting medium or liquid medium. Since each captured set of x, y, and z coordinates for each RFID tag from the population of RFID chips corresponds to a physical point in the casting medium or liquid medium, dimensions for all the various components and features of the printed circuit board assembly are obtainable through the captured coordinates. A volume of the casting medium or liquid medium in the container not occupied by the population of RFID chips, is occupied by the printed circuit board assembly submerged in the casting medium or liquid medium. As a result, the population of RFID tags surround and encompass the various components and features of the printed circuit board assembly. Metrology process 300 displays the plot for the coordinates for each RFID chip from the population of RFID chips associated with object (310). Metrology process 300 displays the plot for the coordinates for the population of RFID chips in user interface on a client device.

Figure 4:
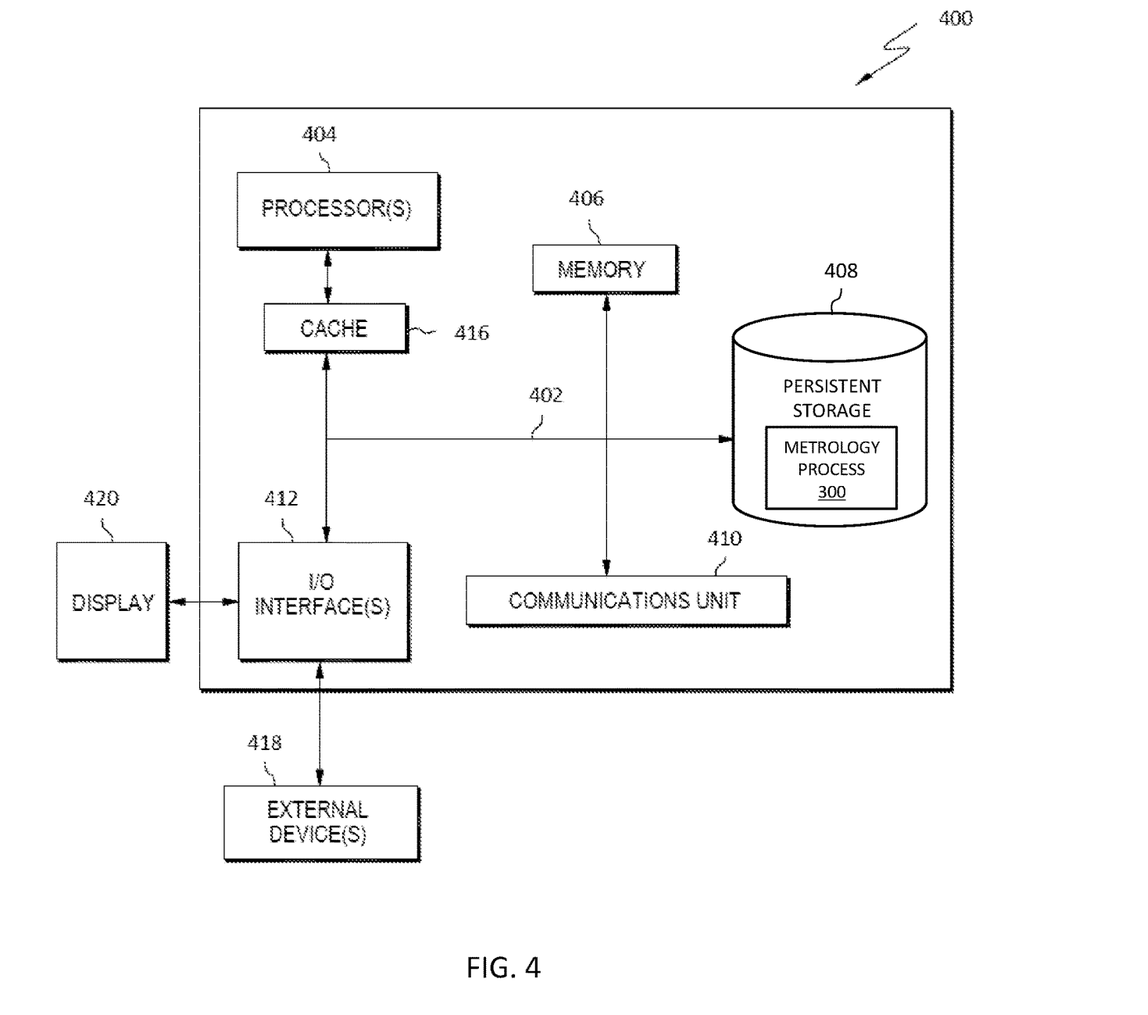
FIG. 4 is a block diagram of components of a computer system for performing a method of initializing and obtaining three-dimensional measurements for an object utilizing radio-frequency identification chips in a medium, in accordance with an embodiment of the present invention

FIG. 4 depicts computer system 400 that can include a program stored in persistence storage 408 for performing metrology process 300 of initializing and obtaining three-dimensional measurements for an object utilizing radio-frequency identification chips in a medium. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage medium. In this embodiment, memory 406 includes random access memory (RAM). In general, memory 406 can include any suitable volatile or non-volatile computer readable storage medium. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage medium that is capable of storing program instructions or digital information.

The medium used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage medium such as, for example, thumb drives, portable optical or magnetic disks, and memory cards. Software and data used to practice embodiments of the present invention can be stored on such portable computer readable storage medium and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or medium) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission medium (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
    placing an object into a container with a plurality of radio-frequency identification (RFID) chips in a medium;
    capturing a plurality of coordinates for the plurality of RFID chips in the medium, wherein a set of coordinates from the plurality of coordinates correspond to each RFID chip from the plurality of RFID chips; and
    plotting the plurality of coordinates for the plurality of RFID chips in the medium, wherein a plot of the plurality of coordinates provides a three-dimensional image of the object.

2. The method of claim 1, further comprising:
    placing the medium into the container;
    placing the plurality of RFID chips into the container with the medium; and
    mixing the plurality of RFID chips into the medium, wherein the plurality of RFID chips are distributed throughout the medium.

3. The method of claim 1, further comprising:
    removing the object from the container with the plurality of RFID chips in the medium; and
    separating the plurality of RFID chips from the medium.

4. The method of claim 1, wherein a combined volume for the medium, volume for the plurality of RFID chips, and volume for the object is equal to or less than a volume for the container.

5. The method of claim 1, wherein the medium is a casting medium, the casting medium being a polymer material selected from the group consisting of: agarose, silicone, epoxy resin, unsaturated polyester resin, and acrylic glass.

6. The method of claim 5, further comprising:
    placing the casting medium into the container, wherein the casting medium is in a liquified state; and
    casting the object with the plurality of RFID chips and the casting medium, wherein the casting medium transitions from the liquified state to a solidified state.

7. The method of claim 6, further comprising:
    applying heat to the casting medium until the casting medium reaches the liquified state.

8. The method of claim 7, wherein casting the object with the plurality of RFID chips and the casting medium further comprises:
    cooling the casting medium with the plurality of RFID chips and the object unto the casting medium reached the solidified state.

9. The method of claim 8, further comprising:
    separating the object from the casting medium with the plurality of RFID chips.

10. The method of claim 9, wherein separating the object from the casting medium, further comprises:
    peeling the casting medium with the plurality of RFID chips in the solidified state from the object.

11. The method of claim 9, wherein separating the object from the casting medium, further comprises:
    applying heat to the casting medium with the plurality of RFID chips and the object until the casting medium reaches the liquified state; and
    removing the object from the casting medium with the plurality of RFID chips in the liquified states.

12. The method of claim 11, further comprising:
filtering the casting medium in the liquified state to remove the plurality of RFID chips, where both the casting medium and the plurality of RFID chips are reusable for a subsequent casting.

13. The method of claim 1, wherein the medium is a liquid medium, the liquid medium being a polymer material selected from the group consisting of: selected from the group consisting of: agarose, polyacrylamide, gelatin, and carrageenan.

14. The method of claim 13, further comprising:
placing the liquid medium into the container; and
placing the plurality of RFID chips into the container with the liquid medium.

15. The method of claim 14, further comprising:
removing the object from the container with the liquid medium with the plurality of RFID chips.

16. The method of claim 15, further comprising:
filtering the liquid medium to remove the plurality of RFID chips, where both the liquid medium and the plurality of RFID chips are reusable for a subsequent casting.

17. A computer implemented method comprising:
initializing a plurality of RFID chips in a medium;
receiving an initial plurality of coordinates for the plurality of RFID chips in the medium, wherein a set of coordinates from the initial plurality of coordinates correspond to each RFID chip from the plurality of RFID chips;
receiving an updated plurality of coordinates for the plurality of RFID chips in the medium subsequent to placing an object into the medium with the plurality of RFID chips, wherein a set of coordinates from the updated plurality of coordinates correspond to each RFID chip from the plurality of RFID chips; and
plotting the set of coordinates from the updated plurality of coordinates for each RFID chip from the plurality of RFID chips to create a three-dimensional image of the object.

18. The computer implemented method of claim 14, further comprising:
instructing, based on the initial plurality of coordinates for the plurality of RFID chips, a vibrating mixer device to mix the medium with the plurality of RFID chips.

19. The computer implemented method of claim 17, wherein initializing the plurality of RFID chips in the medium further comprising:
transmitting, by an RFID reader, a signal to the plurality of RFID chips; and
receiving a unique tag identifier for each RFID chip from the plurality of RFID chips in the medium.

20. The computer implemented method of claim 17, wherein the medium is either a casting medium or a liquid medium.

* * * * *